United States Patent [19]

Edgar et al.

[11] Patent Number: 4,520,391

[45] Date of Patent: May 28, 1985

[54] DIAGONAL GRID IMAGE COMMUNICATION AND DISPLAY

[75] Inventors: Albert D. Edgar; Neil D. Lubart, both of Austin, Tex.

[73] Assignee: International Business Machines Corporation, Armonk, N.Y.

[21] Appl. No.: 450,892

[22] Filed: Dec. 20, 1982

[51] Int. Cl.³ .................... H04N 3/00

[52] U.S. Cl. .................... 358/133; 340/727; 358/242; 364/521

[58] Field of Search .................... 358/133, 242, 138; 340/728, 727, 724, 723; 364/521

[56] References Cited

U.S. PATENT DOCUMENTS

| | | | |
|---|---|---|---|
| 2,921,124 | 1/1960 | Graham | 340/728 |
| 3,429,990 | 2/1969 | Hobrough | 358/242 |
| 3,573,789 | 4/1971 | Sharp | 340/728 |
| 3,680,076 | 7/1972 | Duffek | 340/728 |
| 4,068,265 | 1/1978 | Russell | 358/138 |

*Primary Examiner*—Howard W. Britton
*Attorney, Agent, or Firm*—Douglas H. Lefeve

[57] ABSTRACT

A diagonal pel grid is used in a raster scanned CRT display. This is achieved by displacing alternate scan fields by a half-pel in both axes to form a diagonal checkerboard grid that is interlaced in two axes. This substantially reduces the number of displayed pels to achieve a given quality as perceived by the human eye or substantially increases the apparent resolution of the image when the same number of pels are used as are used in a given rectangularly scanned application.

8 Claims, 8 Drawing Figures

DIAGONAL GRID IMAGE COMMUNICATION AND DISPLAY

TECHNICAL FIELD

This invention relates to the display of images on a raster scanned cathode ray tube (CRT) display. More particularly, this invention is directed to a technique for decreasing the number of displayed pels and decreasing the video bandwidth requirements to produce a given image quality as perceived by the human eye, or, alternatively, a technique of increasing the image quality without increasing the number of pels.

BACKGROUND ART

(Prior Art Statement)

In office systems a need exists to interactively display facsimile and other non-coded information. The ability to display facsimile-like graphics and computer generated images adds very significant flexibility to interactive design tasks, publication layout, data analysis, and real time control.

A present high resolution facsimile standard translates to a scanning density of approximately 200 picture elements (pels) per inch (196 vertical, 204 horizontal) for a total of over 3.7 million pels on an 8½ inch×11 inch document. A direct display of this information on a raster scanned CRT display would require a fast sweep frequency of about 110 KHz and a pel time of about 4 nanoseconds, which are presently beyond the state of the art in CRT displays for data processing system and office system applications.

The grid pel matrix of displays has conventionally been rectangular and aligned to the horizontal and vertical axes in almost all CRT controllers.

It has been shown that the eye is more sensitive to horizontal and vertical lines than to diagonal lines. That is, a grid at 45 degrees requires more contrast to be seen than a grid at the same spatial frequency at 90 degrees or 0 degrees. Also it has been shown that text statistically contains more horizontal and vertical lines than it does diagonal lines, and the horizontal and vertical lines are more important to recognition. Therefore, in the two dimensional spatial frequency domain the horizontal and vertical components contain more signal power and are more important to recognition than the diagonal components.

Since the eye is more sensitive to horizontal and vertical spatial frequency components and these components are also the most important in the recognition of text it follows that a display system should reproduce these components with optimum fidelity. Using techniques of two dimensional Fourier transforms it is generally known that a square sampling grid will yield a square bandwidth. Since the diagonal of a square is the square root of two longer than the horizontal or vertical lines comprising its sides, the bandwidth of a square grid is the square root of two greater for the diagonal frequencies than for the horizontal or vertical frequencies. This is the exact opposite of what is desired in accordance with this discussion. If the spatial bandwidth could be tilted 45 degrees to give a diamond shaped bandwidth in the spatial frequency domain, the widest spatial frequencies would now be allocated to vertical and horizontal frequencies as is desirable in accordance with this discussion. Since the spatial frequency bandwidth rotates as the grid is rotated, rotating the grid 45 degrees will give the desirable spatial frequency characteristics.

A diagonal grid has been used in the printing industry for many years for the reasons outlined above. However, prior to this invention diagonal scanning had not been successfully applied to transient display technologies such as a CRT.

In CRT display technology it has been proposed to use diagonal scan lines in order to generate a diagonal grid. The proposed system uses triangular wave forms into both the x and y axis deflection drivers. The frequency of the x and y drivers is such that the phases will vary by one cycle in a refresh period. The effect of this is to create a Lissajous pattern on the CRT screen such that each point on the phospher is scanned from all four diagonal directions during the course of a refresh interval. This method puts substantial demands on the phase accuracy of the deflection circuits because the screen is scanned from four directions. This technique would also require complex logic in order to translate an image into a serial bit stream suitable for this diagonal scanning method.

It would, therefore, be desirable to achieve a diagonal grid on a transient display in a straight-forward and economical manner which would not require complex hardware for translating the image to be displayed into the appropriate serial bit stream used in creating or refreshing the displayed image.

DISCLOSURE OF THE INVENTION

Circuitry is provided for displacing the pels of alternate fields of an interlaced, raster scanned CRT display system by one-half of the space between pels. The displacement is effected in both axes to form a diagonal checkerboard grid with respect to adjacent illuminated pels. Means are provided to convert data to be displayed from its representation in a traditional square grid into a diagonal grid utilizing half the number of pels that would be used if the data were displayed in a square grid. The video data resulting from this conversion is stored in a bit map display memory for refreshing the CRT. By utilizing the circuitry provided herein for displacing alternating fields by one-half of the pel spacing, the video data stored in the bit map memory is displayed on the CRT screen in a diagonal grid.

Accordingly, if the original image contained N pels, the converted image is displayed on the CRT screen utilizing N/2 pels. The apparent resolution is about 77% of the resolution of the original image although only 50% of the pels are used in displaying the converted image. Thus the apparent resolution per pel is increased. This offers substantial savings in the random access memory used as the bit map display refresh memory. Savings are also realized in the ability to use lower bandwidth circuitry to convey the converted image data.

Alternatively, the same apparent resolution in the diagonal grid as that in the square grid can be achieved using this technique by performing the conversion from the square grid to the diagonal grid so that about 65% of the number of pels in the original square grid are utilized in constructing the converted image in the diagonal grid. This accomplishes a 35% savings in memory and reduced bandwidth requirements in comparison with conventional techniques of displaying the square grid, with no apparent loss in resolution of the displayed image.

It will also be understood by those skilled in the art that in a conventional, coded image only, alphanumeric display the alphanumeric character and symbol fonts to be displayed can be constructed in a diagonal grid rather than a square grid in accordance with this invention. In this case the diagonal grid adapter circuit provided herein is useable to correctly display the font images in a diagonal grid.

Additionally, a technique is provided for converting the image data from the diagonal grid using 50% of the pels of the original pattern back into a square grid using twice the number of pels as the converted diagonal grid image. It is shown herein that the reconstructed square grid image very closely approximates the original square grid image. Thus, it will be understood by those skilled in the art that significant savings can be realized in the bandwidth requirements of data transmission and storate without substantial loss of ultimate image quality by converting image data from a square grid to a diagonal grid for data transmission purposes and reconstructing the data from the diagonal grid representation back to the square grid representation.

The foregoing and other objects, features, and advantages of the invention will be apparent from the following more particular description of preferred embodiments of the invention, as illustrated in the accompanying drawings.

BEST MODE FOR CARRYING OUT THE INVENTION

Figure 1:
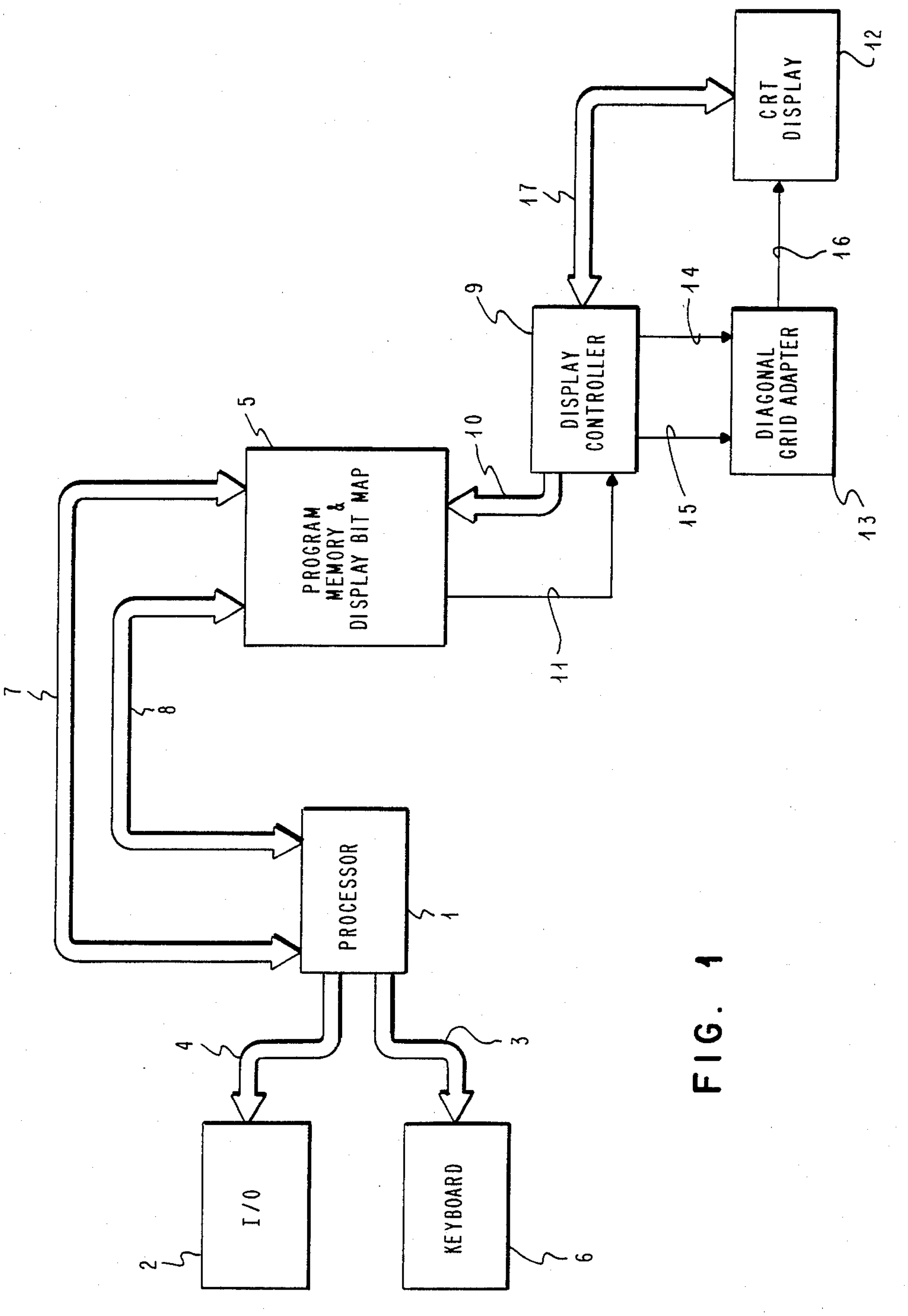
FIG. 1 is a block diagram of a system utilizing the diagonal pel grid technique of this invention.

Referring now to FIG. 1 a diagram of a typical text and/or graphics display system is shown including modifications in accordance with this invention. A processor 1 has a keyboard 6 connected thereto as an input device with input cable 3 attaching these units. Input/output cable 4 is used to connect any of a plurality of input/output devices 2 to processor 1. It will be understood by those skilled in the art that cable 4 and input/output device 2 can represent a plurality of input/output devices. Systems of this type would almost certainly employ a bulk storage of some type (such as a magnetic storage in today's environment) for reading programs into the system and for storing data and programs for processing and future use. Since one of the most common implementations of this invention lies in the environment of the display of noncoded information such as data which might be scanned from a document by an input scanning device, device 2 may represent such a typical scanning device well known in the art. Device 2 may also be a communications adapter since the technique of this invention is highly useful for conversion of image data into a form that can be transmitted with a substantially lower bandwidth requirement or received with a substantially lower bandwidth requirement and reconstructed into substantially the original image data.

Processor 1 is connected to a random access memory 5 suitably large enough for the storage of program instructions and a display bit map in which bit map portion is stored an appropriate array of one and zero bit values for refreshing a CRT display 12. An address and control bus 7 and a data bus 8 connect processor 1 and memory 5 so that any address in memory 5 can be accessed for writing data into memory 5 by processor 1 or reading data out of memory 5 by processor 1.

The CRT display 12 is connected to a display controller 9 by a cable 17. Signals are conveyed along cable 17 to appropriately control the timing and other control functions associated with the display of video data on the display 12. An address bus 10 connected between the display controller 9 and memory 5 provides appropriate access to the display bit map portions of memory 5 to read out the video data to be displayed. The video data read out of the display bit map portion of memory 5 is conveyed along line 11 to the display controller and along line 15 to the diagonal grid adapter. A synchronization signal associated with the slow scan axis of the CRT system is conveyed along line 14 from the display controller to the diagonal grid adapter 13. The video data is supplied to the CRT display 12 along line 16 from the diagonal grid adapter 13. As will be explained in detail relative to the diagonal grid adapter circuit of FIG. 2, adapter 13 functions to delay the video data bits of every other refresh frame by one-half the time between pels to provide for displaying the image data in a diagonal grid pattern rather than a square grid pattern.

Figure 2:
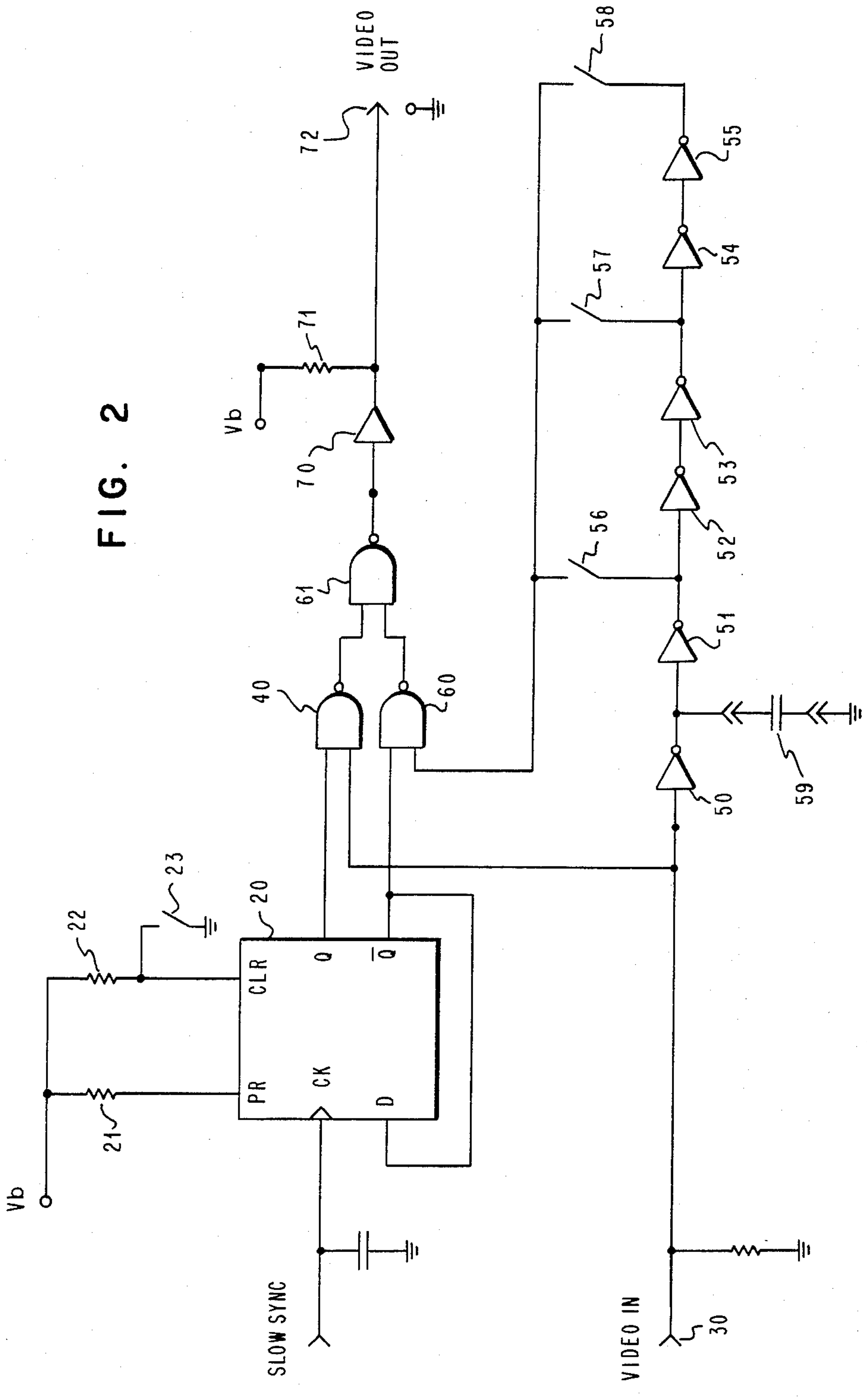
FIG. 2 is a circuit diagram of the diagonal pel grid adapter of this invention.

Referring now to FIG. 2, the function of the diagonal grid adapter circuit is to shift alternating fields in the fast scan axis by one-half the distance between pels. This is accomplished by delaying the video data in every other frame in an interlaced CRT display system by one-half of the time between two pels in the fast scan axis. Proper separation of the pels in the slow scan axis to achieve the diagonal grid pattern is accomplished by interlacing of the fields, as will be understood by those skilled in the art of commercial television.

In FIG. 2 the synchronization signal in the slow scan axis is input to the CK (clock) input of an edge triggered, "D" flip-flop 20. The PR (preset) and CLR (clear) inputs of flip-flop 20 are suitably biased through resistors 21 and 22, respectively, to a positive supply voltage Vb. Switch 23 is used in a "Monte Carlo" or "Chance" manner to provide the proper order of Q and Q (not) signals from the output of flip-flop 20. With the D input of flip-flop 20 tied to the Q (not) output thereof, a succession of synchronization signals associated with the slow scan axis, one such signal for each frame, causes alternating up and down level output signals from flip-flop 20. Thus, an up signal is present at the Q output of flip-flop 20 during one frame, a down signal is present at the Q output of flip-flop 20 during the next frame, and an up signal is present at the Q output of flip-flop 20 during the third frame, etc.

The video data from the bit map memory is sent through the diagonal grid adapter circuit of FIG. 2 during each refresh frame. This video data is input to the circuit at terminal 30 and is always present at an input of NAND gate 40. The video data is also present at the input of INVERT circuit 50.

Assume now that the Q output of flip-flop 20 during a particular refresh frame is at an up level. With this signal applied to an input of NAND gate 40, the output of NAND gate 40 drops with each up level video data bit applied to input 30 of the diagonal grid adapter circuit of FIG. 2. Each time the output level of either of NAND gates 40 or 60 drops, an up level is provided at the output of NAND gate 61. If the Q output of flip-flop 20 is up, the Q (not) output will be down, and thus the output of NAND gate 60 will remain up irrespective of other signals. Thus, while the Q output of flip-flop 20 is at an up level each video data bit input at terminal 30 is gated through NAND gates 40 and 61 and is applied to the input of driver circuit 70. Resistor 71 is connected between the positive supply voltage Vb and driver 70 and biases driver 70. The output of driver 70 is connected to the output terminal 72. The video data bits appearing at output terminal 72 are used to appropriately turn on the CRT beam to "paint" the image data on the CRT screen.

A fixed delay exists in the transmission of these video data bits through NAND gates 40 and 61 and through driver circuit 70. This delay is appropriately increased during alternating frames to shift the pel placement by one-half of the distance between pels for all of the pels displayed in alternating refresh frames. Specifically, between the end of the display of the frame just described wherein the Q output of flip-flop 20 was at an up level and the beginning of the display of the next interlaced frame, an up level is provided at the CK input of flip-flop 20. This toggles flip-flop 20 so that the Q (not) output rises to an up level and the Q output falls to a low level.

With the up level Q (not) input to NAND gate 60, an up level signal to the other input of NAND gate 60 causes the output of NAND gate 60 to drop which, in turn, causes the output of NAND gate 61 to rise to an up level. Pairs of INVERT circuits 50 and 51, 52 and 53, and 54 and 55 are used to provide a noninverting delay to the video data bits input to terminal 30 and conveyed through these pairs of INVERT circuits to an input of NAND gate 60. One, and only one, of switches 56, 57, or 58 is closed to provide this delaying path to the input of NAND gate 60. For a minimal delay, switch 56 is closed. For an intermediate delay switch 57 is closed, and for the maximum delay, switch 58 is closed. Additionally, capacitor 59 of an appropriate value may be added to the circuit to trim the degree of delay to exactly that appropriate to delay the video data bits in the alternate frames of the interlaced display system.

As was the case without the additional delay of the INVERT circuits, the video bits output from NAND gate 61 are applied to driver 70. It will be understood that in addition to the delay offered by gates 60 and 61 and driver 70, which delay is the same as the delay described above relative to the previous display frame when the Q output of flip-flop 20 was up a further delay is provided by the INVERT circuits when, during every other frame, the Q (not) output of flip-flop 20 is at an up level.

Figure 3:
FIG. 3 is an example of an imge to be displayed on a CRT display system.
Figure 4:
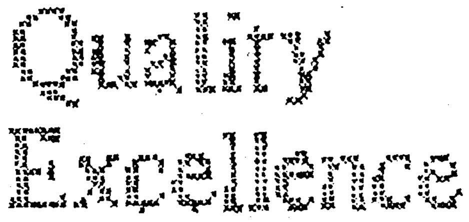
FIG. 4 is a representation of the image of FIG. 3 which would be displayed on a CRT system using a conventional square grid display matrix.
Figure 5:
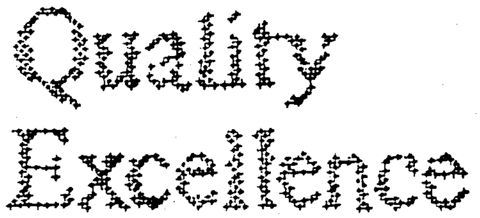
FIG. 5 is a representation of the image of FIG. 3 which would be displayed on a CRT system using a diagonal grid matrix.

Referring now to FIG. 3 an image is shown as an example of a noncoded image for display on a CRT system. Although only the outlines of the characters making up the words "Quality" and "Excellence" are shown in FIG. 3, the space enclosed by outlines of these characters making up these words should be considered to be solidly darkened. Accordingly, the image shown in FIG. 4 is a square grid pel representation of the image of FIG. 3 and was generated by laying a grid over the image of FIG. 3 and entering a dot if more than 30% of a square in the grid was covered. The image of FIG. 5 is the diagonal grid pel representation of the image of FIG. 3 and was generated similarly except that the same overlay grid was tilted 45°. The actual, physical resolution of both images is equivalent to 130 dots/inch on normal sized text, although the apparent resolution of the diagonal grid image of FIG. 5 is significantly higher. For comparison, a high resolution display has about 96 pels/inch, a moderate cost graphic dot matrix printer has about 120 pels/inch, the CCITT facsimile standard specifies 200 pels/inch, and a high resolution dot matrix printer has about 240 pels/inch.

With respect to the display images of FIGS. 4 and 5 the text and grid can never be in perfect alignment. This leads to an apparent staircasing of the text line. For example, both words in the square grid of FIG. 4 appear to drop midway through as though the page in a typewriter were moved up slightly. The diagonal grid image of FIG. 5 exhibits the same jump midway through which may be seen by viewing the image askew but because of the diagonalization the magnitude of the jump is the square root of 2 less and, therefore, is almost unnoticeable.

The lateral alignment of vertical lines in the images of FIGS. 4 and 5 is subject to chance and happenstance but less distortion is apparent in the vertical lines of the diagonal grid image of FIG. 5. With the square grid image of FIG. 4 the vertical lines in the "u", "l", "i", "t", and "n" are either too thick or too thin depending on chance grid alignment. With the diagonal grid image of FIG. 5 the vertical lines of these characters are visually almost equal. Most anomalies in the image of FIG. 5 are traceable to the original image of FIG. 3. A noticeable problem in the vertical lines of the square grid image of FIG. 4 is that in some cases the thickness changes within a single line, as in the "i" of "Quality" and the first "l" of "Excellence". The diagonal grid image of FIG. 5 also exhibits these intra-line width changes. For example, the "l" in "Quality" is two pels wide at the top and three pels wide at the bottom, but this is less noticeable than the first "l" of "Excellence" in FIG. 4.

Additionally, subtle features such as seriphs show more often in the diagonal grid image of FIG. 5 than in the square grid image of FIG. 4. For example, the "u" of "Quality" has all three seriphs in the diagonal image of FIG. 5 but only two of the seriphs show in this character in the square grid image of FIG. 4.

Figure 6:
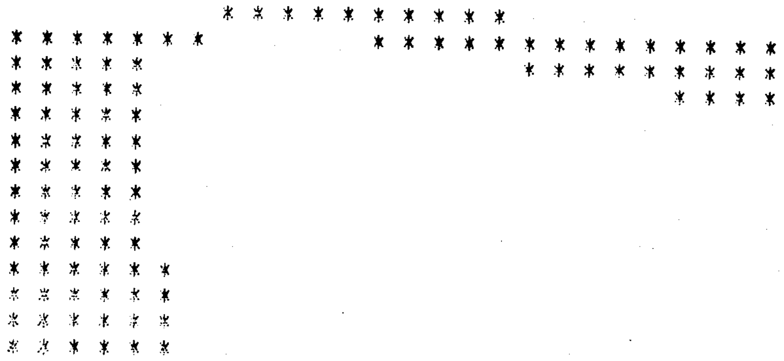
FIG. 6 is an image representation as would be displayed on a CRT display using a square grid.

Referring now to FIG. 6 an arbitrary, random image is shown. Using the BASIC computer programming language and an IBM Personal Computer a "1" was entered as data for each of the asterisks symbols representing pels in FIG. 6 and a "0" was entered for each of the pel positions not containing an asterisk. Table 1 at the end of this description, below shows the entry of this data in statements 20–170.

Figure 7:
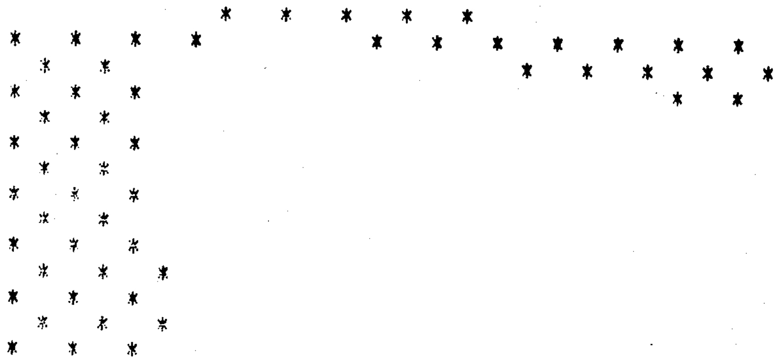
FIG. 7 is a conversion of the square grid image of FIG. 6 into a diagonal grid in accordance with this invention.
Figure 8:
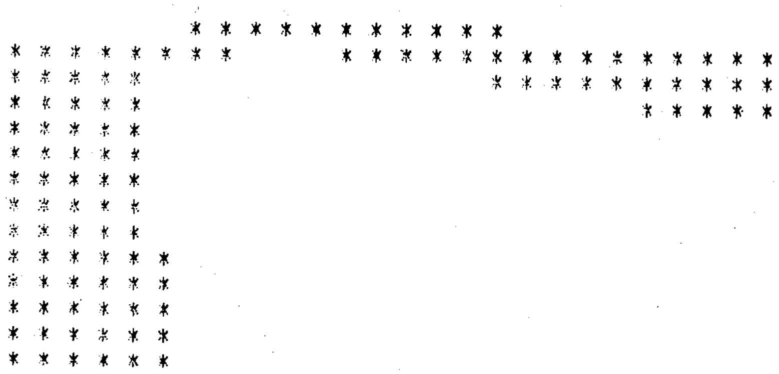
FIG. 8 is a reconversion according to this invention of the diagonal grid image of FIG. 7 back to a square grid image.

FIG. 6 is a square grid image. The image of FIG. 6 is shown in FIG. 7 after having been converted to a diagonal grid image using half the number of pels as used in FIG. 6. The program listed in Table 1 shows this diagonal grid conversion starting at statement 280. The arbitrary, random pattern is still quite recognizable in FIG. 7 and the apparent resolution to a viewer has suffered by only about 23%. However, only half the number of pels are needed in the bit map memory for display refresh purposes and only half the bandwidth is needed in communicating this video data. Finally, beginning at statement 400 in the program of Table 1, the diagonal grid representation in FIG. 7 is converted back to a square grid representation as shown in FIG. 8. It will be obvious to the most casual observer that FIG. 8 closely enough resembles FIG. 6 to prove that FIG. 7 contained most of the intelligent information of the image of FIG. 6, since it was able to serve as the source information to derive the image data of FIG. 8.

In summary, therefore, circuitry is provided for displacing the pels of alternate fields of an interlaced, raster scanned CRT display system by one-half of the space between pels. Means are provided to convert data to be displayed from its representation in a traditional square grid into a diagonal grid utilizing half the number of pels that would be used if the data were displayed in a square grid. Utilizing the circuitry provided herein for displacing alternate fields by one-half of the pel spacing, video data stored in a bit map memory is displayed on a CRT screen in a diagonal grid.

The diagonal grid adapter circuit provided herein is also useable to correctly display font images in a diagonal grid when character and symbol fonts are constructed in a diagonal grid rather than in a square grid.

A technique is also provided for converting the image data from the diagonal grid (which uses 50% of the pels of the original pattern) back into a square grid using twice the number of pels as the converted diagonal grid image, or about the original number of pels. Since the reconstructed square grid image so closely approximates the original square grid image it is understood by those skilled in the art that significant savings are realized in the bandwidth requirements of data transition without substantial loss of ultimate image quality by converting image data from a square grid to a diagonal grid for data transmission or storage purposes and reconstructing the data from the diagonal grid representation back to the square grid representation.

While the invention has been shown and described with reference to particular embodiments thereof, it will be understood by those skilled in the art that the foregoing and other changes in form and details may be made therein without departing from the spirit and scope of the invention.

```
10   DIM SQ%(32,16),DIAG%(16,16)
20   DATA 0,0,0,0,0,0,0,0,0,0,0,0,0,0,0,0,0,0,0,0,0,0,0,0,0,0,0,0,0,0,0,0
30   DATA 0,0,0,0,0,0,0,0,0,1,1,1,1,1,1,1,1,1,1,0,0,0,0,0,0,0,0,0,0,0,0,0
40   DATA 0,0,1,1,1,1,1,1,1,0,0,0,0,0,1,1,1,1,1,1,1,1,1,1,1,1,1,1,0,0,0,0
50   DATA 0,0,1,1,1,1,1,0,0,0,0,0,0,0,0,0,1,1,1,1,1,1,1,1,1,1,1,1,0,0,0,0
60   DATA 0,0,1,1,1,1,1,0,0,0,0,0,0,0,0,0,0,0,0,0,0,0,0,0,1,1,1,1,0,0,0,0
70   DATA 0,0,1,1,1,1,1,0,0,0,0,0,0,0,0,0,0,0,0,0,0,0,0,0,0,0,0,0,0,0,0,0
80   DATA 0,0,1,1,1,1,1,0,0,0,0,0,0,0,0,0,0,0,0,0,0,0,0,0,0,0,0,0,0,0,0,0
90   DATA 0,0,1,1,1,1,1,0,0,0,0,0,0,0,0,0,0,0,0,0,0,0,0,0,0,0,0,0,0,0,0,0
100  DATA 0,0,1,1,1,1,1,0,0,0,0,0,0,0,0,0,0,0,0,0,0,0,0,0,0,0,0,0,0,0,0,0
110  DATA 0,0,1,1,1,1,1,0,0,0,0,0,0,0,0,0,0,0,0,0,0,0,0,0,0,0,0,0,0,0,0,0
120  DATA 0,0,1,1,1,1,1,0,0,0,0,0,0,0,0,0,0,0,0,0,0,0,0,0,0,0,0,0,0,0,0,0
130  DATA 0,0,1,1,1,1,1,1,0,0,0,0,0,0,0,0,0,0,0,0,0,0,0,0,0,0,0,0,0,0,0,0
140  DATA 0,0,1,1,1,1,1,1,0,0,0,0,0,0,0,0,0,0,0,0,0,0,0,0,0,0,0,0,0,0,0,0
150  DATA 0,0,1,1,1,1,1,1,0,0,0,0,0,0,0,0,0,0,0,0,0,0,0,0,0,0,0,0,0,0,0,0
160  DATA 0,0,1,1,1,1,1,1,0,0,0,0,0,0,0,0,0,0,0,0,0,0,0,0,0,0,0,0,0,0,0,0
170  DATA 0,0,0,0,0,0,0,0,0,0,0,0,0,0,0,0,0,0,0,0,0,0,0,0,0,0,0,0,0,0,0,0
180  REM
190  REM input the original square grid
200  FOR Y=0 TO 15: FOR X=0 TO 31: READ SQ%(X,Y): NEXT X: NEXT Y
210  REM
220  REM print the original square grid
230  FOR Y=0 TO 16: LIN$="": FOR X=0 TO 32
240  IF SQ%(X,Y)=1 THEN LIN$=LIN$+"* ": ELSE LIN$=LIN$+"  "
250  NEXT X: LPRINT LIN$: NEXT Y
260  REM
270  REM convert from square to diagonal grid
280  FOR Y=1 to 15: ZAG=Y MOD 2: FOR XD=1 TO 15: X=2*XD+ZAG
290  P=2*SQ%(X,Y)+SQ%(X+1,Y)+SQ%(X-1,Y)+SQ%(X,Y+1)+SQ%(X,Y-1)
300  IF P>=3 THEN DIAG%(XD,Y)=1: ELSE DIAG%(XD,Y)=0
310  NEXT XD: NEXT Y
320  REM
330  REM print the converted diagonal grid
340  FOR Y=0 TO 16: IF Y MOD 2=1 THEN LIN$="  ": ELSE LIN$=""
350  FOR XD=0 TO 16
360  IF DIAG%(XD,Y)=1 THEN LIN$=LIN$+"* ": ELSE LIN$=LIN$+"  "
370  NEXT XD: LPRINT LIN$: NEXT Y
380  REM
390  REM convert from diagonal back to square grid
400  FOR Y=1 TO 15: ZAG=Y MOD 2: FOR XD=1 TO 15: X=2*XD+ZAG
410  SQ%(X,Y)=DIAG%(XD,Y)
420  P=DIAG%(XD,Y)+DIAG%(XD-1,Y)+DIAG%(XD+ZAG-1,Y+1)+DIAG%(XD+ZAG-1,Y-1)
430  IF P>=2 THEN SQ%(X-1,Y)=1: ELSE SQ%(X-1,Y)=0
440  NEXT XD: NEXT Y
450  REM
460  REM print the recovered square grid
470  FOR Y=0 TO 16: LIN$="": FOR X=0 TO 32
480  IF SQ%(X,Y)=1 THEN LIN$=LIN$+"* ": ELSE LIN$=LIN$+"  "
490  NEXT X: LPRINT LIN$: NEXT Y
500  END
```

We claim:

1. A method of displaying image data on an image display device comprising:

converting the image data pels in the image to be displayed from a square grid matrix to a diagonal grid matrix; and directly displaying said image data after conversion to a diagonal grid matrix on an image display device so that alternate columns or rows of pels in the displayed image are displaced from each other by one-half the distance between pels in the displayed image.

2. The method of displaying image data of claim 1, wherein said step of displaying further comprises:

transmitting said image data to said display device into distinct interlaced fields.

3. The method of displaying image data of claim 2 wherein said step of transmitting said image data further comprises:

delaying each of the bits of said image data in a first of said two distinct interlaced fields by a time equal to one-half of the time between the display of two adjacent pels on a single row.

4. The method of displaying image data of claim 3 wherein said step of delaying further comprises:

activating a toggling circuit by a control signal associated with the slow scan axis of said image display device to inhibit said delaying of the bits of said image data in the second of said two distinct interlaced fields.

5. A system for displaying image data on an image display device comprising:

means for converting the image data pels in an image to be displayed from a square grid matrix to a diagonal grid matrix; and means for directly displaying said image data after conversion to a diagonal grid matrix on said image display device so that alternate columns or rows of pels in the displayed image are displaced from each other by one-half the distance between the pels in said displayed image.

6. The system claim 5, wherein said means for displaying further comprises:

means for transmitting said image data to said display device into distinct interlaced fields.

7. The system of claim 6 wherein said means for transmitting said image data further comprises:

means for delaying each of the bits of said image data in a first of said two distinct interlaced fields by a time equal to one-half of the time between the display of two adjacent pels on a single row.

8. The system of claim 7 wherein said means for delaying further comprises:

toggling means activated by a signal associated with the slow scan axis of said image display device for inhibiting said means for delaying said bits of said image data in the second of said two distinct interlaced fields.

* * * * *